United States Patent
Khim

(10) Patent No.: US 11,731,048 B2
(45) Date of Patent: Aug. 22, 2023

(54) METHOD OF DETECTING IDLE GAME CONTROLLER

(71) Applicant: Sony Interactive Entertainment LLC, San Mateo, CA (US)

(72) Inventor: Jeansoo Khim, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/306,706

(22) Filed: May 3, 2021

(65) Prior Publication Data
US 2022/0347571 A1 Nov. 3, 2022

(51) Int. Cl.
| A63F 13/49 | (2014.01) |
| H04B 17/318 | (2015.01) |
| A63F 13/235 | (2014.01) |
| A63F 13/428 | (2014.01) |

(52) U.S. Cl.
CPC ............ *A63F 13/49* (2014.09); *A63F 13/235* (2014.09); *A63F 13/428* (2014.09); *H04B 17/318* (2015.01)

(58) Field of Classification Search
CPC ...... A63F 13/235; A63F 13/49; A63F 13/493; A63F 2300/1031; A63F 2300/204; A63F 2300/636; A63F 2300/638
See application file for complete search history.

(56) References Cited

U.S. PATENT DOCUMENTS

| 5,528,265 | A  | * | 6/1996 | Harrison | ............ G06F 3/03543 345/158 |
| 6,262,712 | B1 | * | 7/2001 | Osborne | ................. A63F 13/06 345/156 |
| 6,609,146 | B1 | * | 8/2003 | Slotznick | ................ G06F 9/451 709/200 |
| 7,881,902 | B1 | * | 2/2011 | Kahn | ..................... G01B 21/02 702/160 |
| 8,298,082 | B2 | * | 10/2012 | Asami | ................... A63F 13/219 463/36 |
| 9,881,058 | B1 | * | 1/2018 | Liu | .................... G06F 16/24578 |
| 2001/0011995 | A1 | * | 8/2001 | Hinckley | .............. G06F 3/0489 345/156 |
| 2002/0144259 | A1 | * | 10/2002 | Gutta | ............... H04N 21/44222 725/12 |
| 2003/0097659 | A1 | * | 5/2003 | Goldman | ............. H04N 21/442 725/89 |
| 2005/0101314 | A1 | * | 5/2005 | Levi | ................... G08B 21/0238 455/423 |

(Continued)

OTHER PUBLICATIONS

"Playing to Wait: A Taxonomy of Idle Games," by Sultan A. Alharthi et al., published Apr. 26, 2018 in Proceedings of the 2018 CHI Conference on Human Factors in Computing Systems, Paper No. 621. Source: https://dl.acm.org/doi/10.1145/3173574.3174195 (Year: 2018).*

(Continued)

*Primary Examiner* — Steven J Hylinski
(74) *Attorney, Agent, or Firm* — John L. Rogitz

(57) ABSTRACT

A technique detects when a computer simulation controller such as a computer game controller is idle and, thus, that the simulation (game) should be paused immediately without waiting for an "AwayFromKeyboard" timer to time out by detecting whether the user has laid the controller down and gone away or simply is not responding.

14 Claims, 4 Drawing Sheets

(56) References Cited

U.S. PATENT DOCUMENTS

| | | | | |
|---|---|---|---|---|
| 2006/0109242 | A1* | 5/2006 | Simpkins | G06F 3/0346 345/156 |
| 2006/0178212 | A1* | 8/2006 | Penzias | G06F 3/033 463/37 |
| 2007/0061851 | A1* | 3/2007 | Deshpande | A63F 13/00 725/102 |
| 2007/0206018 | A1* | 9/2007 | Bajic | G06F 1/3265 345/501 |
| 2007/0265083 | A1* | 11/2007 | Ikebata | A63F 13/57 463/37 |
| 2008/0104512 | A1* | 5/2008 | Tarlton | G06F 3/01 704/E15.04 |
| 2008/0220854 | A1* | 9/2008 | Midgley | A63F 13/12 463/25 |
| 2010/0248832 | A1* | 9/2010 | Esaki | A63F 13/843 463/36 |
| 2011/0081969 | A1* | 4/2011 | Ikeda | A63F 13/211 463/37 |
| 2011/0281633 | A1* | 11/2011 | Park | G06Q 30/02 463/20 |
| 2013/0019187 | A1* | 1/2013 | Hind | H04L 65/4025 715/753 |
| 2013/0074002 | A1 | 3/2013 | Markovic et al. | |
| 2013/0173064 | A1* | 7/2013 | Fadell | F24F 11/30 700/276 |
| 2013/0205206 | A1* | 8/2013 | Hawver | A63F 13/10 715/704 |
| 2013/0267327 | A1* | 10/2013 | Froy, Jr. | G07F 17/3211 463/42 |
| 2013/0303274 | A1* | 11/2013 | Gadher | G07F 17/3218 463/29 |
| 2013/0322846 | A1 | 12/2013 | Ferren et al. | |
| 2014/0101343 | A1* | 4/2014 | Townsend | A63F 13/23 710/14 |
| 2014/0274384 | A1* | 9/2014 | Boswell | A63F 13/323 463/31 |
| 2015/0258415 | A1* | 9/2015 | Trivedi | G09B 19/0038 700/91 |
| 2016/0027278 | A1* | 1/2016 | McIntosh | G08B 21/0423 715/741 |
| 2016/0042566 | A1 | 2/2016 | Mao | |
| 2016/0184712 | A1* | 6/2016 | Colenbrander | A63F 13/79 463/29 |
| 2016/0359990 | A1* | 12/2016 | Dabbiere | H04L 63/083 |
| 2017/0095732 | A1* | 4/2017 | Ghaffari | H04L 67/131 |
| 2017/0238881 | A1* | 8/2017 | Cheng | A61B 5/742 |
| 2017/0243056 | A1* | 8/2017 | Cheng | A63B 24/0059 |
| 2018/0324703 | A1* | 11/2018 | Knudson | H04W 52/0258 |
| 2018/0348843 | A1* | 12/2018 | de Cesare | G06F 1/3296 |
| 2020/0160646 | A1 | 5/2020 | Alderucci et al. | |
| 2020/0175845 | A1* | 6/2020 | Hu | G08B 29/183 |
| 2020/0184959 | A1* | 6/2020 | Yasa | G10L 15/1815 |
| 2020/0324194 | A1* | 10/2020 | Enokido | A63F 13/211 |
| 2022/0068272 | A1* | 3/2022 | Kwatra | G10L 15/063 |

OTHER PUBLICATIONS

"A lot of games reduce the speed of offline progress. What on earth is the benefit of this?" by u/Ajreil, published 2018. Source: https://www.reddit.com/r/incremental_games/comments/8iie60/a_lot_of_games_reduce_the_speed_of_offline/(Year: 2018).*

"Detecting If the User is Idle or Inactive," by kirupa, published Sep. 11, 2013. Source: https://www.kirupa.com/html5/detecting_if_the_user_is_idle_or_inactive.htm (Year: 2013).*

"A Complete Guide on How to Make an Idle Game," by David Hartery, published Aug. 10, 2020. Source: https://www.adjust.com/blog/how-to-make-an-idle-game/ (Year: 2020).*

"Games that sit somewhere between active and idle games don't do a good job of being either," by u/Ajreil, published 2018, source: https://www.reddit.com/r/incremental_games/comments/8iia4f/games_that_sit_somewhere_between_active_and_idle/ (Year: 2018).*

""It Started as a Joke": On the Design of Idle Games," by Katta Spiel et al., published Oct. 2019 in Proceedings of the Annual Symposium on Computer-Human Interaction in Play, pp. 495-508. Source: https://dl.acm.org/doi/10.1145/3311350.3347180 (Year: 2019).*

"Operation Sports Forums—Why does the game automatically pause if you don't touch the controller after a few minutes," by krondeezy, published Nov. 7, 2017. Source: https://forums.operationsports.com/forums/printthread.php?t=920600&pp=40 (Year: 2017).*

"International Search Report and Written Opinion", dated Sep. 2, 2022, from the counterpart PCT application PCT/US22/27418.

* cited by examiner

METHOD OF DETECTING IDLE GAME CONTROLLER

FIELD

The present application relates to technically inventive, non-routine solutions that are necessarily rooted in computer technology and that produce concrete technical improvements.

BACKGROUND

As understood herein, when a user puts down a computer simulation controller such as a computer game controller, the game does not know if user is away or simply not responding.

SUMMARY

Present principles make it possible for the game system or the game to determine whether the user has abandoned playing the game or simply is on a short break, so that the simulation system can take immediate action without waiting for the elapse of an AwayFromKeyboard timer. By immediately detecting an "away" state, the user experience is enhanced.

Accordingly, a device includes at least one computer memory that is not a transitory signal and that in turn includes instructions executable by at least one processor to identify a motion state of a controller of a computer simulation, and at least in part responsive to the motion state being stationary, slow down or pause presentation of the computer simulation.

In example implementations the instructions can be executable to, at least in part responsive to the motion state being stationary, initially slow down presentation of the computer simulation and after an elapse of a period, pause presentation of the computer simulation.

In example embodiments the instructions may be executable to, at least in part responsive to the motion state being stationary and responsive to a confidence satisfying a threshold, slow down or pause presentation of the computer simulation, or put the computer simulation in non-active state per the context of the simulation. The motion state being stationary can be based at least in part on a motion or position sensor in the controller, whereas the confidence may be determined at least in part based on signals from a sensor other than the motion or position sensor in the controller. The sensor can include at least one camera, at least one microphone, at least one wireless receiver, and combinations thereof. When the sensor is a wireless receiver that signals include signal strength indications.

In some embodiments the instructions may be executable to establish at least one period based at least in part on the confidence, with the period being associated with slowing down or pausing the computer simulation. In examples, the instructions can be executable to identify the motion state being stationary at least in part by accounting for motion of a platform on which the controller is disposed.

In another aspect, a method includes identifying that a controller of a computer simulation is not moving relative to a platform supporting the controller, and based at least in part on the identifying, slowing down or pausing the computer simulation.

In another aspect, an apparatus includes at least one controller of a computer simulation that is configured for controlling presentation of the computer simulation on at least one display. The computer simulation is received from at least one source of computer simulations. At least one processor is programmed with instructions executable by the processor to alter a speed of presentation of the computer simulation at least in part based on a motion state of the at least one controller.

The details of the present application, both as to its structure and operation, can best be understood in reference to the accompanying drawings, in which like reference numerals refer to like parts, and in which:

DETAILED DESCRIPTION

Figure 1:
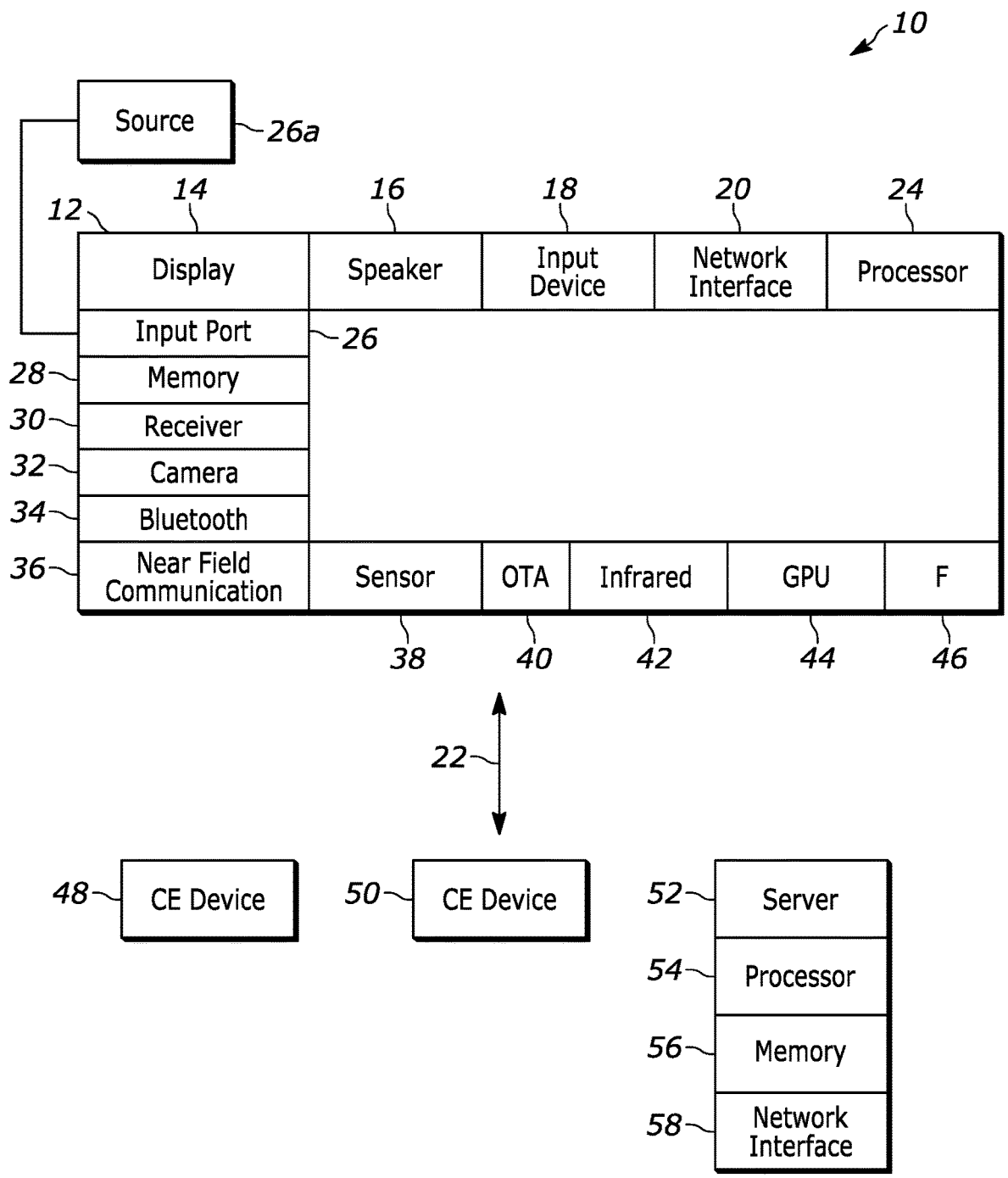
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and TV set top boxes, desktop computers, any computerized Internet-enabled implantable device, and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1.

Figure 2:
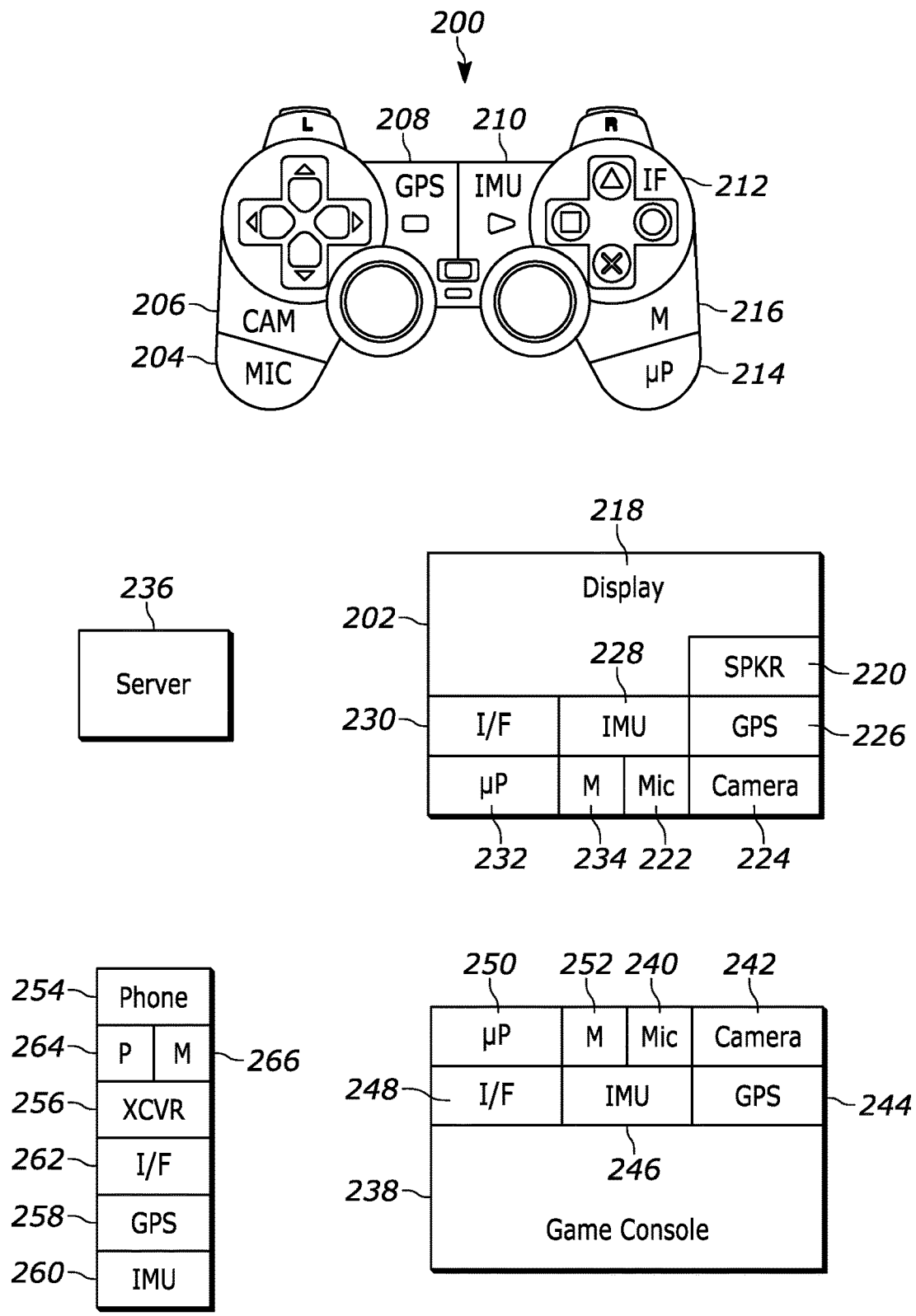
FIG. 2 illustrates an example specific system consistent with present principles.

FIG. 2 illustrates a specific example system. A computer simulation controller (CSC) 200 that may be hand-held and include operating keys to control presentation of a computer simulation on a display device 202 is shown. The CSC 200 may be, for example, a Play Station Dual Shock® controller.

As shown in FIG. 2, the controller 200 may include, in addition to operating keys, one or more microphones 204, one or more cameras 206, and one or more location sensors 208 such as global positioning satellite (GPS) sensors. The controller 200 may further include one or more inertial measurement units (IMU) 210 such as one or more of an accelerometer, gyroscope, magnetometer, and combinations thereof.

Moreover, the controller 200 may include one or more communication interfaces 212 such as wired or wireless transceivers including infrared (IR) transceivers, Bluetooth® transceivers, and Wi-Fi transceivers, and combinations thereof. One or more processors 214 accessing instructions on one or more computer storages 216 may be provided to control the components of the controller 200.

Similarly, if desired the display 202 may include, in addition to a video display 218 and one or more speakers 220, one or more microphones 222, one or more cameras 224, and one or more location sensors 226 such as GPS sensors. The display 202 may further include one or more IMU 228.

Moreover, the display 202 may include one or more communication interfaces 230 such as wired or wireless transceivers including IR transceivers, Bluetooth® transceivers, and Wi-Fi transceivers, and combinations thereof. One or more processors 232 accessing instructions on one or more computer storages 234 may be provided to control the components of the display 202.

The simulation presented on the display 202 under control of the controller 200 may be sent from one or more sources of computer simulations such as one or more servers 236 communicating with various components herein via a wide area computer network and one or more computer simulation consoles 238 communicating with various components herein via wired and/or wireless paths. In the example shown, the console 238 may include one or more microphones 240, one or more cameras 242, and one or more location sensors 244 such as GPS sensors. The console 238 may further include one or more IMU 246.

Moreover, the console 238 may include one or more communication interfaces 248 such as wired or wireless transceivers including IR transceivers, Bluetooth® transceivers, and Wi-Fi transceivers, and combinations thereof. One or more processors 250 accessing instructions on one or more computer storages 252 may be provided to control the components of the console 238.

In addition, one or more ancillary devices such as a wireless smart phone 254 may be provided. In addition to a keypad and wireless telephony transceiver 256, the phone 254 may include microphone(s), camera(s), one or more location sensors 258 such as GPS sensors, one or more IMU 260, one or more communication interfaces 262 such as wired or wireless transceivers including IR transceivers, Bluetooth® transceivers, and Wi-Fi transceivers, and combinations thereof, on or more processors 264 accessing instructions on one or more computer storages 266 to control the components of the phone 254.

It is to be understood that logic herein may be implemented on any one or more of the storages shown in FIG. 1 or 2 and executed by any one or more processors described herein, and that motion/location signals and signals from sensors other than motion/location sensors may be implemented by any of the appropriate sensors shown and/or described herein.

As discussed herein, motion of the controller 200 can be used to infer whether a user has stopped paying attention to a simulation presented on the display device 202 or has simply stopped inputting signals but may still be watching the simulation, with the simulation being altered accordingly. For example, a motion state of the controller 200 can be identified using signals from motion sensors described herein and the simulation slowed down (played at a slower speed, but faster than a complete pause) and/or paused at least in part responsive to the motion state being stationary, if desired based on a confidence in the inference of a stationary state using signals from sensors other than the motion sensors. Also, whether the controller 200 is in the stationary state can depend on whether it is moving relative to a platform supporting the controller 200, to account for motion of a controller that may be located on a moving platform such as a ship, vehicle, or indeed a swaying high-rise building.

Figure 3:
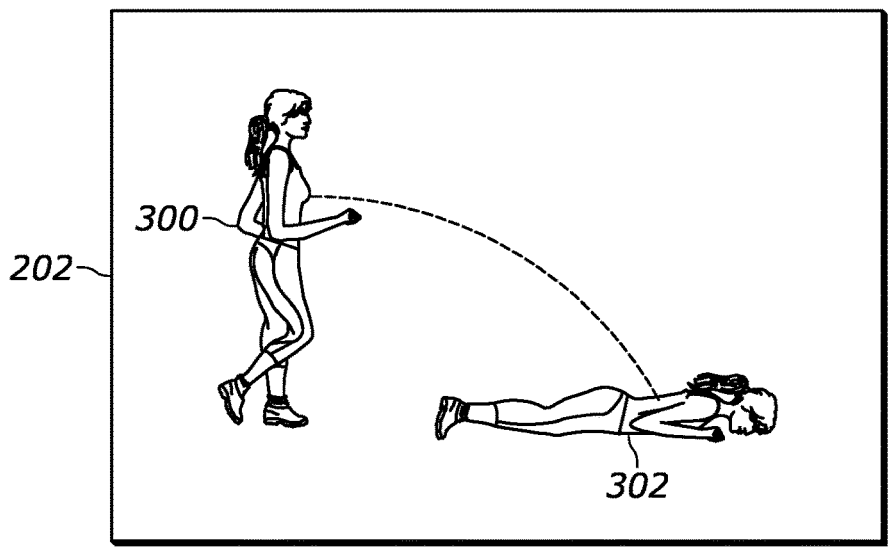
FIG. 3 illustrates an example screen shot from a computer simulation such as a computer game consistent with present principles.

FIG. 3 illustrates that altering presentation of the simulation responsive to the motion state of the controller 200 may alternatively or further include changing the pose of a simulation character 300 associated with the user from an action pose shown in the left in FIG. 3 to an inactive pose 302 (such as a prone or supine pose) when it is determined that the user has lost interest in the simulation according to logic below. Other examples of altering game play based on principles herein include putting a racing game into auto-drive mode when the user is determined to have lost interest.

Figure 4:
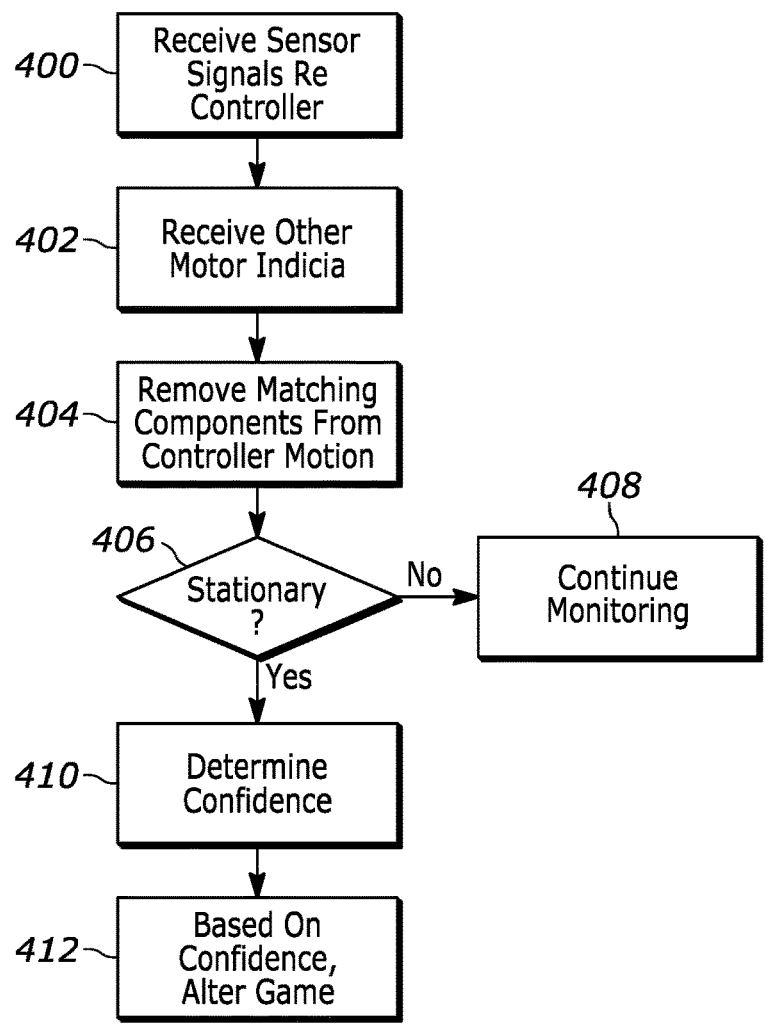
FIGS. 4 and 5 illustrate example logic in example flow chart format consistent with present principles and FIG. 6 illustrates an example screen shot from a computer simulation such as a computer game consistent with present principles.

Accordingly, and turning now to FIG. 4, block 400 indicates that sensor signals are received from the controller 200 by any one or more of the processors described herein. By way of example, signals from the GPS 208 and/or IMU 210 of the controller 200 may be received, indicating motion (or no motion) of the controller 200.

Other motion indicia may be received at block 402. By way of example, signals from the GPS and/or IMU of any one or more of the display 202, game console 238, and phone 254 may be received, indicating motion (or no motion) of the component from whence the signals originate. Note that triangulation of signals from various components also may be used to determine motion.

Proceeding to block 404, components in motion signals from the controller 200 that match components in background motion signals from any one or more of the display 202, game console 238, and phone 254 are removed, such that any remaining motion-indicating signals from the controller 200 represent motion of the controller relative to the platform supporting the controller. If these remaining motion-indicating signals from the controller 200 represent motion of the controller at decision diamond 206, the logic of FIG. 4 essentially continues to monitor for signals described herein at block 408.

On the other hand, if the motion-indicating signals from the controller 200 represent no motion of the controller 200 (i.e., the controller 200 is stationary as it would be if laid down on a surface by the user), the logic proceeds to block 410. At block 410, a confidence in the determination that the motion state of the controller 200 is stationary is determined as described further herein. Moving to block 412, based on the confidence determined at block 410, presentation of the computer simulation is altered.

For example, if a low confidence of no motion is determined, the simulation may proceed at current play back speed by a pose of the character 300 (FIG. 3) altered to indicate that the user may have lost attention. If medium confidence of no motion is determined, the simulation may proceed but at a slower speed than normal play back speed, whereas if high confidence of no motion is determined, the simulation may be paused. When the user is binge watching a streaming video service, the service may keep playing while the user is holding the controller as indicated by motion signals from the controller and paused shortly after the user is away when controller is detected to be stationary (e.g., on the floor or dropped.)

Figure 5:
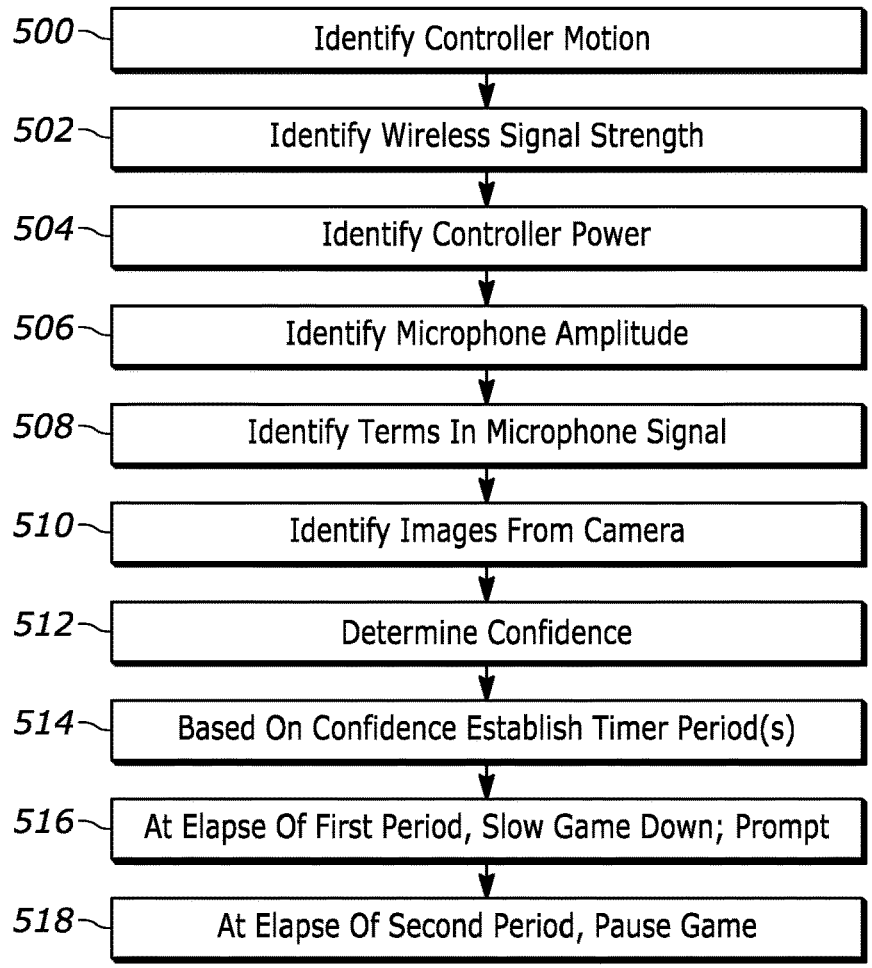

FIG. 5 illustrates further details. Commencing at block 500, motion of the control 200 is identified as described above. If desired, wireless signal strength of wireless signals from the controller 200 is identified at block 502. Controller power also may be identified at block 504 as determined by identifying whether the controller is in an on or off state as indicated by the absence of signals from the controller in response to, e.g., queries from other components.

Also, if desired the amplitude of acoustic signals such as voice signals sensed by any of the microphones here may be identified at block 506. Voice recognition may be implemented on the acoustic signals at block 508 to identify terms in the voice signals. Furthermore, images in signals from any of the cameras herein may be recognized at block 510. Based on any one or more of the above, confidence may be determined at block 512.

For example, if wireless signal strength of the controller 200 or of a wireless headset worn by the user such as described in the case of the CE device 50 in FIG. 1 remains above a threshold at block 502, confidence that the user has lost attention in the simulation by virtue of laying the controller down may be low, on the basis that the user has not walked away from the display 202/console 238 (which may be used to detect the signal strength) although the user may have set the controller down. Similarly, if wireless signal strength of the controller 200 (or headset) drops below a threshold at block 502, confidence that the user has lost attention in the simulation by virtue of laying the controller down may be high, on the basis that the user has walked away from the display 202/console 238 and then laid the controller down.

If the controller remains energized at identified at block 504, confidence may be high that the user has not lost attention in the simulation by virtue of maintaining the controller energized, whereas if the controller is identified at block 504 as being deenergized, confidence may be high that the user has lost attention in the simulation by virtue of turning off the controller.

Turning to the determination at block 512 using the microphone signals at block 506, if amplitude of audible signals such as voice received from the microphone of the controller or of other microphone herein remains above a threshold, confidence that the user has lost attention in the simulation by virtue of laying the controller down may be low, on the basis that the user has remained near the monitoring microphone (e.g., the microphone on the display 202/console 238) although the user may have set the controller down. Similarly, if acoustic signal strength from the microphone used for monitoring at block 506 drops below a threshold, confidence that the user has lost attention in the simulation by virtue of laying the controller down may be high, on the basis that the user has walked away from the display 202/console 238.

Turning to the determination at block 512 using the vocal term recognition at block 508, confidence that the user has lost attention in the simulation by virtue of speaking certain terms (e.g., "time for lunch") may be high, on the basis that the terms indicate a loss of interest. Similarly, confidence that the user has lost attention in the simulation by virtue of speaking certain terms (e.g., "time for a kill shot") may be low, on the basis that the terms indicate interest in the simulation.

Turning to the determination at block 512 using the image recognition at block 510, confidence may be high that the user has lost attention in the simulation by virtue of recognizing, using face recognition, that the user is staring into space with gaze diverted from the display device 202 or has walked away from the controller. On the other hand, confidence may be high that the user has not lost attention in the simulation by virtue of recognizing, using face recognition, that the user is looking at the display device 202.

When multiple blocks in FIG. 5 are used to determine confidence, each block may be accorded a respective weight, such that one determination of high confidence in lack of interest may outweigh another determination of low confidence of lack of interest. For example, the controller being deenergized as determined at block 504, indicating high confidence in lack of interest, may outweigh loud signals from a microphone as determined at block 506, otherwise indicating low confidence of lack of interest. Likewise, images from a camera at block 510 indicating that the user is staring intently at the display device, indicating high confidence of interest, may outweigh terms identified at block 508 that otherwise would indicate low confidence of interest.

The weights may be determined empirically and/or by machine learning (ML) models using, e.g., neural networks such as convolutional neural networks (CNN) and the like. A ML model may be trained on a training set of motion signals with accompanying sensor signals and ground truth of interest/no interest for each tuple in the training set (or at least for each of a percentage of the tuples). Training may be supervised, unsupervised, or semi-supervised.

Block 514 of FIG. 5 indicates that the confidence determined at block 512 may be used to establish one or more timer periods. A first time period may be the time period after which the simulation is slowed (but not paused), and a second time period may be the period after slowing the simulation that the simulation is paused, absent a change in motion signals from the controller 200.

For example, if it is determined that the controller is in a state of no motion, but confidence is low that the user has lost interest, a relatively long period or periods may be established. On the other hand, if it is determined that the controller is in a state of no motion and confidence is high that the user has lost interest, a relatively shorter period or periods may be established.

Figure 6:
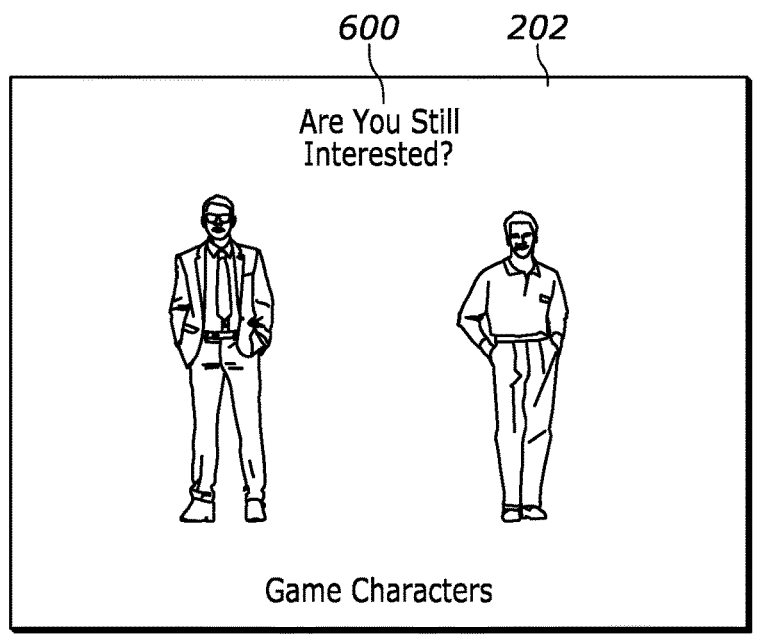

Proceeding to block 516, absent a change of motion signals and/or a change in confidence that the user has lost interest, at the elapse of the first (shorter) period the simulation is slowed. If desired, as indicated at 600 in FIG. 6, a visual or audible prompt may be presented on the display device 202 to the user to alert the user that the system believes the user may be losing interest in the simulation. Block 518 indicates that absent changed motion/confidence signals/determinations, at the elapse of a second period after the simulation was slowed, the simulation may be paused until such time as the controller 200 is manipulated again by the user or signals from sensors described herein indicate that the user has regained interest, with a high confidence.

Present principles may be used to detect when the game system should be turned off/put in sleep mode. When binge watching streaming video service, an option may be provided to keep it playing while holding the controller 200 or the phone 254 and pause shortly after the user is away when the controller was detected on floor or dropped when the option to do so was enabled by the system or by the user.

It will be appreciated that whilst present principals have been described with reference to some example embodiments, these are not intended to be limiting, and that various alternative arrangements may be used to implement the subject matter claimed herein.

What is claimed is:

1. A device comprising:
    at least one computer memory that is not a transitory signal and that comprises instructions that, when executed by at least one processor, configure the device to:
    identify a motion state of a controller of a computer simulation based at least in part on at least one motion sensor in the controller; and
    at least in part responsive to the motion state being stationary and a confidence based at least in part on at least one signal from a first sensor, initially slow down presentation of the computer simulation and after an elapse of a period, pause presentation of the computer simulation, at least in part responsive to the motion state being stationary and responsive to the confidence satisfying a threshold, slow down or pause presentation of the computer simulation, the first sensor being other than the motion sensor in the controller and the first sensor being other than a timer.

2. The device of claim 1, wherein the instructions are executable to:
    at least in part responsive to the motion state being stationary, slow down presentation of the computer simulation.

3. The device of claim 1, wherein the instructions are executable to:
    at least in part responsive to the motion state being stationary, pause presentation of the computer simulation.

4. The device of claim 1, wherein the instructions are executable to:
    establish at least one period based at least in part on the confidence, the period being associated with slowing down or pausing the computer simulation.

5. The device of claim 1, comprising the at least one processor executing the instructions.

6. A device comprising:
    at least one computer memory that is not a transitory signal and that comprises instructions that, when executed by at least one processor, configure the device to:
    identify a motion state of a controller of a computer simulation; and
    at least in part responsive to the motion state being stationary and responsive to a confidence satisfying a threshold, slow down or pause presentation of the computer simulation, the motion state being stationary being based at least in part on a motion sensor in the controller, the confidence being determined at least in part based on signals from a first sensor, the first sensor being other than the motion sensor in the controller and the first sensor being other than a timer,
    wherein the first sensor comprises at least one camera.

7. A device comprising:
    at least one computer memory that is not a transitory signal and that comprises instructions that, when executed by at least one processor, configure the device to:
    identify a motion state of a controller of a computer simulation; and
    at least in part responsive to the motion state being stationary and responsive to a confidence satisfying a threshold, slow down or pause presentation of the computer simulation, the motion state being stationary being based at least in part on a motion sensor in the controller, the confidence being determined at least in part based on signals from a first sensor, the first sensor being other than the motion sensor in the controller and the first sensor being other than a timer,
    wherein the first sensor comprises at least one microphone.

8. A device comprising:
    at least one computer memory that is not a transitory signal and that comprises instructions that, when executed by at least one processor, configure the device to:
    identify a motion state of a controller of a computer simulation; and
    at least in part responsive to the motion state being stationary and responsive to a confidence satisfying a threshold, slow down or pause presentation of the computer simulation, the motion state being stationary being based at least in part on a motion sensor in the controller, the confidence being determined at least in part based on signals from a first sensor, the first sensor being other than the motion sensor in the controller and the first sensor being other than a timer,
    wherein the first sensor comprises at least one wireless receiver.

9. The device of claim 8, wherein the signals from the wireless receiver comprise signal strength indications.

10. A device comprising:
    at least one computer memory that is not a transitory signal and that comprises instructions that, when executed by at least one processor, configure the device to:

identify a motion state of a controller of a computer simulation; and at least in part responsive to the motion state being stationary and responsive to a confidence satisfying a threshold, slow down or pause presentation of the computer simulation, the motion state being stationary being based at least in part on a motion sensor in the controller, the confidence being determined at least in part based on signals from a first sensor, the first sensor being other than the motion sensor in the controller and the first sensor being other than a timer, wherein the instructions are executable to:

identify the motion state being stationary at least in part by accounting for motion of a platform on which the controller is disposed.

11. The device of claim 10, comprising accounting for motion of a platform on which the controller is disposed at least in part by removing components in motion signals from the controller that match components in motion signals representing motion of the platform.

12. An apparatus comprising:

at least one controller of a computer simulation, the controller being configured for controlling presentation of the computer simulation on at least one display, the computer simulation being received from at least one source of computer simulations; and at least one processor programmed with instructions that when executed by the processor configure the processor to:

responsive to a first signal from at least one of: a camera, a microphone, a wireless transceiver, present the computer simulation at normal play back speed and alter a pose of at least one character in the computer simulation to indicate that a player of the computer simulation may have lost attention;

responsive to a second signal from at least one of: the camera, the microphone, the wireless transceiver, play back the computer simulation at a slower speed than normal play back speed and higher than zero; and responsive to a third signal from at least one of: the camera, the microphone, the wireless transceiver, pause the computer simulation.

13. The apparatus of claim 12, wherein the at least one processor is in the source and the source comprises at least one computer simulation console.

14. The apparatus of claim 12, wherein the at least one processor is in the source and the source comprises at least one server communicating with the display over a wide area computer network.

* * * * *